United States Patent
Ropertz et al.

(10) Patent No.: US 10,428,814 B2
(45) Date of Patent: Oct. 1, 2019

(54) PISTON FUEL PUMP FOR AN INTERNAL COMBUSTION ENGINE

(71) Applicant: Robert Bosch GmbH, Stuttgart (DE)

(72) Inventors: Peter Ropertz, Oberriexingen (DE); Achim Laub, Waiblingen (DE); Heiko Jahn, Tamm (DE); Thomas Sebastian, Erdmannhausen (DE); Soeren Stritzel, Boeblingen (DE)

(73) Assignee: Robert Bosch GmbH, Stuttgart (DE)

(*) Notice: Subject to any disclaimer, the term of this patent is extended or adjusted under 35 U.S.C. 154(b) by 316 days.

(21) Appl. No.: 14/652,211

(22) PCT Filed: Dec. 17, 2013

(86) PCT No.: PCT/EP2013/076799
§ 371 (c)(1),
(2) Date: Jun. 15, 2015

(87) PCT Pub. No.: WO2014/095781
PCT Pub. Date: Jun. 26, 2014

(65) Prior Publication Data
US 2015/0369190 A1 Dec. 24, 2015

(30) Foreign Application Priority Data

Dec. 20, 2012 (DE) .................. 10 2012 224 029
Dec. 16, 2013 (DE) .................. 10 2013 226 062

(51) Int. Cl.
*F04B 53/14* (2006.01)
*F16J 15/56* (2006.01)
(Continued)

(52) U.S. Cl.
CPC .......... *F04B 53/143* (2013.01); *F02M 59/02* (2013.01); *F02M 59/025* (2013.01);
(Continued)

(58) Field of Classification Search
CPC ..... F04B 53/16; F04B 53/143; F15B 15/1471
See application file for complete search history.

(56) References Cited

U.S. PATENT DOCUMENTS

| | | | | |
|---|---|---|---|---|
| 2,349,170 A | * | 5/1944 | Jackman | F16J 15/166 220/304 |
| 2006/0237916 A1 | * | 10/2006 | Peter | F16J 15/3236 277/438 |
| 2008/0122184 A1 | * | 5/2008 | Hocker | F02M 59/442 277/366 |

FOREIGN PATENT DOCUMENTS

DE       103 22 598      12/2004
DE    10 2008 002169     12/2009
(Continued)

OTHER PUBLICATIONS

Zollner, EP 0156136 English Mach Translation, Sep. 1985.*
International Search Report for PCT/EP2013/076799, dated Feb. 12, 2014.

*Primary Examiner* — Kenneth J Hansen
(74) *Attorney, Agent, or Firm* — Norton Rose Fulbright US LLP; Gerard Messina (57) ABSTRACT

A piston fuel pump for an internal combustion engine includes: a pump cylinder; and a pump piston which is movably accommodated in the pump cylinder. The pump piston is guided radially with the aid of at least a first and at least a second guide section which are spaced axially apart from each other, the first guide section being situated in a pump cylinder of the piston fuel pump, and the second guide section being situated radially outwardly in the area of the end section facing the drive. The piston fuel pump has a supporting and sealing unit for the pump piston on the first guide section, which includes a guidance area for the radial guidance of the pump piston in the pump cylinder and a sealing area having a sealing lip.

12 Claims, 5 Drawing Sheets

(51) Int. Cl.
*F02M 59/02* (2006.01)
*F02M 59/44* (2006.01)
*F04B 15/02* (2006.01)

(52) U.S. Cl.
CPC ........... *F02M 59/442* (2013.01); *F04B 15/02* (2013.01); *F04B 53/14* (2013.01); *F16J 15/56* (2013.01)

(56) References Cited

FOREIGN PATENT DOCUMENTS

| | | | | |
|---|---|---|---|---|
| EP | 0 156 136 | | 10/1985 | |
| EP | 1 312 791 | | 5/2003 | |
| GB | 609 951 | | 9/1948 | |
| GB | 608951 | A1 | 9/1948 | |
| GB | 929528 | A * | 6/1963 | ............. E21D 15/44 |
| JP | H0254970 | | 4/1990 | |
| JP | H11251245 | A | 9/1999 | |
| JP | 2005133681 | A | 5/2005 | |
| JP | 2005337061 | A | 12/2005 | |
| JP | 2010510457 | A | 4/2010 | |
| WO | WO 94/29577 | | 12/1994 | |

* cited by examiner

PISTON FUEL PUMP FOR AN INTERNAL COMBUSTION ENGINE

BACKGROUND OF THE INVENTION

1. Field of the Invention

The present invention relates to a piston fuel pump for an internal combustion engine.

2. Description of the Related Art

Fuel systems of internal combustion engines are known from the art, in which the fuel is transported from a fuel tank into a fuel rail under high pressure with the aid of a mechanically driven piston fuel pump. For this purpose, a movably supported pump piston is provided in the piston fuel pump, which compresses fuel in a delivery chamber of the piston fuel pump. The pump piston is slidingly guided in a piston bushing through a tight fit, in a sliding manner and having a small sealing gap. For supporting and sealing via a gap seal, the piston bushing must have a certain length and, if necessary, absorb large transverse forces. Therefore, the piston bushing is often manufactured from steel. In addition, due to high tolerance requirements, a so-called "piston pairing" is used, i.e., a certain piston is associated with each pump housing. Furthermore, the cylinder in the pump housing must be extensively honed.

BRIEF SUMMARY OF THE INVENTION

The present invention relates to a piston fuel pump including a pump piston which has an end section facing a drive. According to the present invention, the pump piston is guided radially with the aid of at least a first and at least a second guide section, the first and the second guide sections being spaced axially apart from each other. The first guide section is situated in a pump cylinder of the piston fuel pump, and the second guide section is situated radially outwardly in the area of the end section of the pump piston facing the drive. The pump piston is thus guided and/or supported at two support points which are spaced considerably apart from one another. On the one hand, a guidance or support is carried out via the first guide section; on the other hand, a guidance or support is carried out via the second guide section. The particular guidance and support points lie in the particular end sections of the pump piston near the force application points at which transverse forces may arise, for example, in the vicinity of the drive (cam drive) of the pump piston. Thus, the loads on the guidance or support points may be reduced. In addition, the present invention also has the advantage that oil leakage or fuel leakage of the piston fuel pump may be reduced by the second guide section acting as an additional wiper element. In addition, an axial slant (skew) of the pump piston caused by undesirable transverse forces may be reduced. As a result, the fatigue strength of the piston fuel pump may also be improved.

In one embodiment of the piston fuel pump, the second guide section is situated directly adjacent to a piston seal. As a result, a transverse force acting upon the piston seal may be reduced and wear of the piston seal may thus be prevented, and the oil leakage or fuel leakage may also be reduced.

Furthermore, it may be provided that the second guide section is situated on the side of the piston seal facing the drive. As a result, a particularly large axial clearance is made possible between the first and the second guide sections, whereby in particular the described transverse forces may be reduced even further.

In one additional embodiment of the piston fuel pump, it includes a seal carrier which supports both the piston seal and the second guide section. As a result, a particularly compact and robust arrangement of these elements is made possible.

The sealing effect of the piston seal may be improved if it has at least two sealing lips arranged axially opposite each other on a radially inner section. As a result, a particularly good effect is made possible both during an upward stroke and during a downward stroke of the pump piston.

In addition, it may be provided that the piston seal includes at least one radially circumferential toroidal sealing section on a radially outer section. As a result, a sealing effect between the piston seal and an inner wall of the seal carrier may be improved, whereby the oil leakage and/or the fuel leakage may be reduced further. The toroidal sealing section may also be used only to support the piston seal on the seal carrier in an axially immovable manner.

In one additional embodiment of the piston fuel pump, the second guide section is ring-shaped and has an essentially L-shaped radial cross section. As a result, the second guide section may be arranged particularly tightly and securely on the seal carrier, in particular in a force-locked manner. As a result, among other things, the fatigue strength of the piston fuel pump may be increased.

In another embodiment, a ratio of a radial play between the second guide section and the pump piston and an axial length of the second guide section is less than 0.01. As a result, the function of the second guide section may be improved further.

In particular, because of the small amount of radial play, the second guide section acts like a gap seal.

Additional embodiments of the piston fuel pump relate in particular to the first guide section. Thus, the piston fuel pump according to the present invention may be improved with the aid of the second guide section (as described above) and/or via the additional embodiments of the first guide section according to the present invention described below.

In particular, it may be provided that the pump piston has a supporting and sealing arrangement for the pump piston on the first guide section, the supporting and sealing arrangement including a first guidance area for the radial guidance of the pump piston in the pump cylinder and a sealing area having a sealing lip. The aforementioned supporting and sealing arrangement has a stand-alone inventive character and could in this respect be claimed independently of other features or in any arbitrary combination with other features. The supporting and sealing arrangement has the advantage that a piston bushing and the corresponding highly precise fit of the piston in the piston bushing is no longer mandatory; thus, it is possible to reduce costs considerably. Instead, supporting and sealing are functionally separated into a support area and a sealing area. The sealing lip [of the sealing area] makes possible low-friction, gap-free sealing which is therefore highly precise. Because the sealing lip is designed elastically and is present at least partially under pre-tension on a pump cylinder wall, a pre-tension is generated. The pre-tension makes it possible to ensure a sealing function in the sealing area even during an intake stroke of the piston fuel pump, i.e., when the pump piston moves to the bottom dead center. During the compression stroke, i.e., when the pump piston moves to the top dead center, if the sealing lip is directed toward the delivery chamber, it may then be pressed against the pump cylinder wall in a sealing, pressure-supported manner by the fuel pressure prevailing in the delivery chamber.

Furthermore, it may be provided that the piston fuel pump includes a plastic element on which the supporting and sealing arrangement is formed. By designing the first and/or second guide section as a plastic element, the high tolerance requirements are omitted, and an additional honing process on the assembly line of the piston fuel pump may be dispensed with. In addition, the plastic element may be manufactured as a simple injection molded part, whereby it may be manufactured in a particularly economical manner. The risk of piston seizure due to materials fusing may be avoided by the selection of the plastic element.

One embodiment of the piston fuel pump provides that the supporting and sealing arrangement is fixedly connected to the pump piston; preferably, the pump piston has a circular ring-like shoulder to which the supporting and sealing arrangement is clip-fitted and/or glued. Preferably, the supporting and sealing arrangement is designed with the aid of a plastic element. By connecting the plastic element to the pump piston, the plastic element is able to follow the upward and downward movement of the pump piston, the connection preferably being formed in a detachable and inspectable manner in the case of a clip connection. It is therefore possible to replace the plastic element in the event of wear.

The shoulder may be situated in the vicinity of an end section of the pump piston facing a delivery chamber of the piston fuel pump. The provision of the shoulder in the vicinity of the end section is advantageous, since the guide section may thus be situated near a possible support or force application point, and transverse forces arising on the end section of the pump piston may be absorbed by the plastic element.

Furthermore, it is provided that the supporting and sealing arrangement is formed as a single piece. By manufacturing the plastic element as one piece, it may be manufactured in just one production step, for example, via an injection-molding process.

One additional embodiment of the piston fuel pump provides that the supporting and sealing arrangement is formed in multiple parts. This is advantageous, since various plastics may be selected for the guidance area and for the sealing area which are adapted to the particular requirements, i.e., for guidance and/or support and for the sealing function.

One additional refinement of the piston fuel pump according to the present invention is characterized in that the parts of the supporting and sealing arrangement may be clip-fitted and/or glued to each other. This is advantageous, since the parts may be connected to each other regardless of the choice of material, i.e., the material of the guidance area and the sealing area.

Furthermore, it is conceivable that a gap is present between the pump cylinder and the guidance area in the range of approximately $1/100$ mm (millimeters) up to approximately $10/100$ mm, preferably approximately $3/100$ mm. This is advantageous, since the gap makes it possible to avoid seizing of the pump piston in the pump cylinder.

In an additional embodiment of the piston fuel pump, the first guide section, i.e., the supporting and sealing arrangement, and/or the second guide section, include(s) a plastic material, in particular a polyamide (PA) and/or a polyetheretherketone (PEEK). It has been found that during the manufacture of the plastic element from polyamide (PA) or polyetheretherketone (PEEK), excellent results are achievable with respect to the guidance or support in the guidance area and with respect to the sealing in the sealing area.

The present invention also relates to a piston fuel pump including a pump piston and a supporting and sealing arrangement for the pump piston, the supporting and sealing arrangement including a guidance area for the radial guidance of the pump piston in the pump cylinder and a sealing area having a sealing lip.

Examples of the present invention are explained in greater detail below with reference to the attached drawings.

DETAILED DESCRIPTION OF THE INVENTION

The same reference numerals are used in all figures for functionally equivalent elements and dimensions, even for different specific embodiments.

Figure 1:
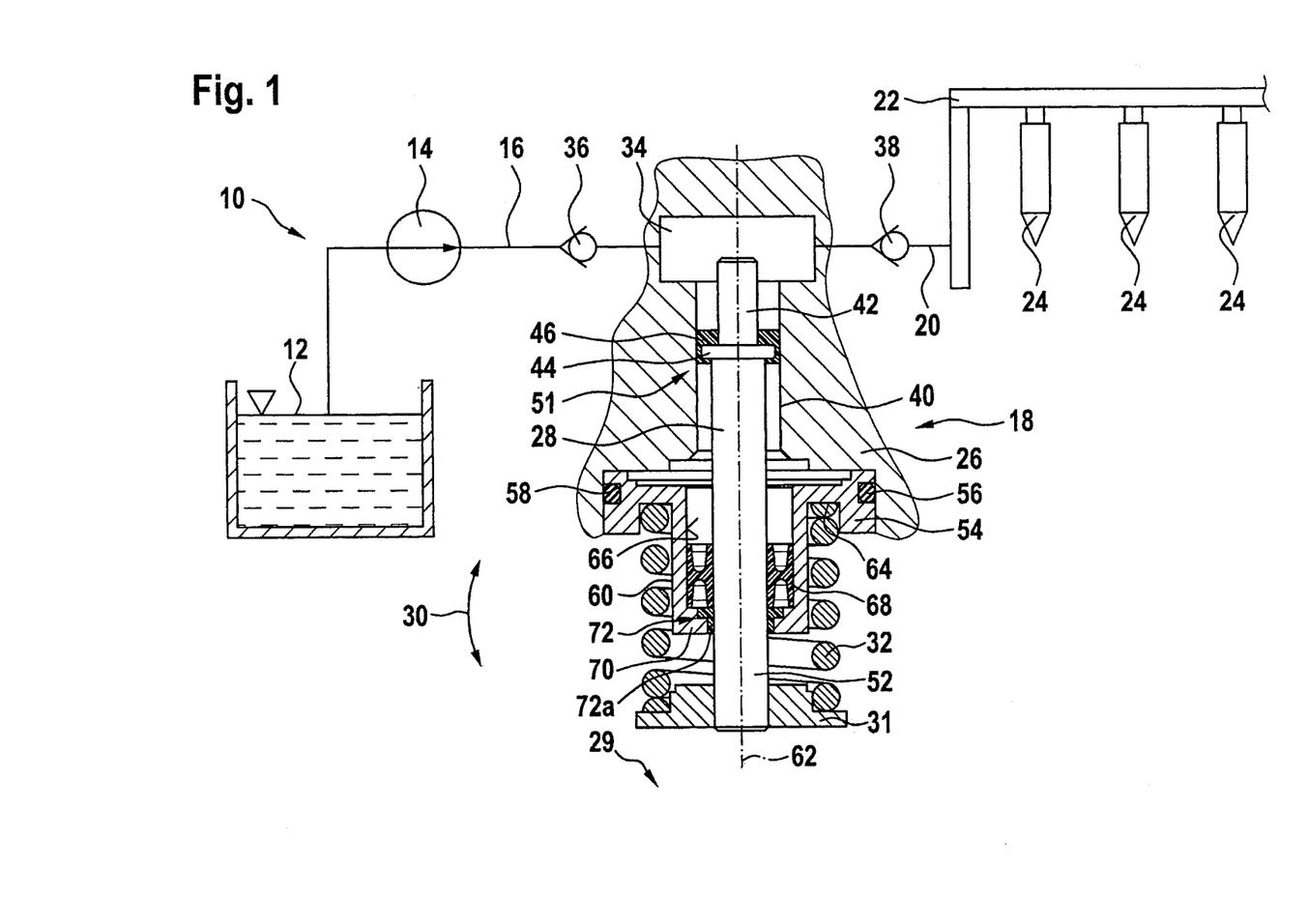
FIG. 1 shows a schematic representation of a fuel system of an internal combustion engine with a section of a piston fuel pump according to the present invention, in which a pump piston is guided radially with the aid of a first and a second guide section.

A fuel system of an internal combustion engine has an overall reference numeral 10 in FIG. 1. It includes a fuel tank 12 from which an electric pre-feed pump 14 feeds the fuel into a low-pressure line 16. Low-pressure line 16 leads to a high-pressure pump in the form of a piston fuel pump 18. A high-pressure line 20 leads from piston fuel pump 18 to a fuel rail 22. Multiple injectors 24 are connected to fuel rail 22, which inject the fuel directly into combustion chambers (not depicted) which are associated with each of them.

Piston fuel pump 18 includes a pump housing 26, of which only a section is depicted, in which a pump piston 28 is movably guided or supported. Pump piston 28 may be moved in a back-and-forth motion, which is indicated by a lateral double arrow 30, by a drive 29 (roller tappet, cam drive) which is represented only by its reference numeral. A spring collar 31 is pressed against a lower end section 52 of pump piston 28 in FIG. 1, which is subjected to an axial force by a coil spring 32. Pump piston 28 and pump housing 26 delimit a delivery chamber 34. Delivery chamber 34 is connectable to low-pressure line 16 via an intake valve 36. Furthermore, delivery chamber 34 is connectable to high-pressure line 20 via an outlet valve 38.

Both intake valve 36 and outlet valve 38 are designed as check valves. An embodiment of intake valve 36 as a quantity control valve is not depicted, but is possible. In such a quantity control valve, intake valve 36 may be forced open during a delivery stroke of pump piston 28, so that the fuel is not fed into fuel rail 22, but rather back into low-pressure line 16. As a result, the fuel quantity fed into fuel rail 22 by piston fuel pump 18 may be adjusted.

Pump piston 28 is guided within a pump cylinder 40, which in this respect is part of pump housing 26. In FIG. 1, pump piston 28 has an upper end section 42 on one end facing delivery chamber 34. In the vicinity of this upper end section 42, pump piston 28 furthermore has a circular ring-shaped shoulder as a type of radially protruding circumferential collar 44. Pump piston 28 or shoulder 44 is clip-fitted to a supporting and sealing arrangement formed by a plastic element 46, plastic element 46 having a guidance area 48 for the axial guidance and/or radial support of pump piston 28 in pump cylinder 40, and a sealing area 50 designed as a sealing lip. Shoulder 44 and plastic element 46 including guidance area 48 and sealing area 50 are more readily apparent in FIGS. 6 and 7. In particular, shoulder 44 and plastic element 46 together form a first guide section 51, with the aid of which pump piston 28 is radially guided in pump cylinder 40.

Pump piston 28 furthermore has aforementioned lower end section 52 on its end facing away from delivery chamber 34. A seal carrier 54 is fixedly situated on pump housing 26 in the vicinity of this lower end section 52. An O-ring seal 56 is provided in a groove 58 between seal carrier 54 and pump housing 26. Seal carrier 54 has a cylinder section 60 which extends coaxially to pump piston 28 and with the aid of which coil spring 32 is guided. Coil spring 32 dips at least partially into a spring receiving groove 64 of seal carrier 54 along a longitudinal piston axis 62, where it supports itself axially against seal carrier 54. Overall, seal carrier 54 is formed in the shape of an inverted hat in the depicted cross-sectional view.

Seal carrier 54 furthermore has a circular-cylindrical receiving section 66 in the interior which is essentially formed by the inner circumferential wall of cylinder section 60. A ring-shaped piston seal 68 is situated in this receiving section 66 in a fixed position relative to pump housing 26, piston seal 68 having an approximately H-shaped cross section. Furthermore, a second guide section 72 is also situated in a fixed position relative to pump housing 26, in a collar section 70 extending radially inwardly on the projecting end of cylinder section 60. In particular, piston seal 68 and second guide section 72 are connected in a force-locked manner to seal carrier 54. An area in FIG. 1 above piston seal 68 is also referred to as the "fuel side," and an area below second guide section 72 is also referred to as the "oil side."

Second guide section 72 is presently also designed as a (second) plastic element 72a. This second guide section 72 (or second plastic element 72a) which is thus spaced considerably apart from first guide section 51 (or first plastic element 46), viewed in the axial direction of pump piston 28, provides the radial guidance or two-point support for pump piston 28, along with first guide section 51 (or guidance area 48 of plastic element 46). Thus, seal carrier 54 supports both piston seal 68 and second guide section 72. It should be noted at this point that first guide section 51 and second guide section 72 may also be implemented independently of each other.

The support point of second guide section 72 is present in the vicinity of the force application via coil spring 32 or via the cam drive, which is not depicted, on lower end section 52 of pump piston 28 in FIG. 1.

Thus, a torque loading of the support points may be reduced. By separating the support into first and second guide sections 51 and 72, the support may be provided in the vicinity of upper end section 42 and lower end section 52 of pump piston 28, whereby the influence of transverse forces may be reduced. Also compare FIGS. 3 and 4 below. A resulting lower support loading may thus make possible the use of plastic elements 46 and 72a.

Figure 2:
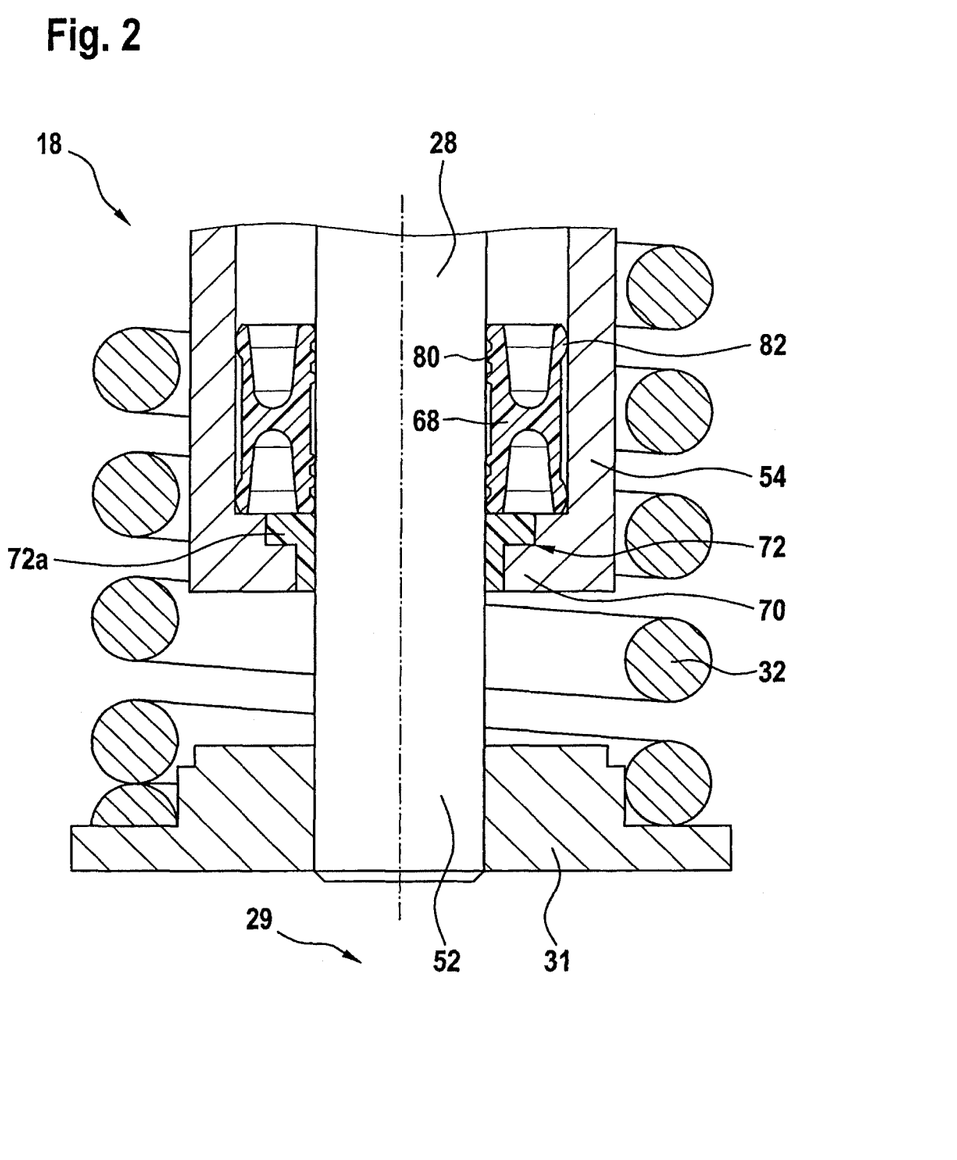
FIG. 2 shows an axial sectional view of the piston fuel pump in an area of the second guide section, similar to a lower area of FIG. 1.

FIG. 2 shows an axial sectional view of piston fuel pump 18 in an area of seal carrier 54 and second guide section 72, similar to a lower area of FIG. 1. Seal carrier 54 is presently designed as a steel deep-drawn part; however, it could also be a plastic part. It is apparent that second guide section 72 is situated directly adjacent to piston seal 68. In particular, second guide section 72 is situated on the side of piston seal 68 facing drive 29.

Furthermore, it is apparent from FIG. 2 that piston seal 68 has a total of six sealing lips 80 on a radially inner section, which are circumferential and directed radially inwardly and arranged axially opposite each other in groups of three. A total of two radially circumferential toroidal sealing sections 82 are situated on a radially outward section of piston seal 68. Sealing lips 80 thus seal ("dynamically") against a radially outward surface of axially movable pump piston 28, and sealing sections 82 seal ("statically") against receiving section 66 (see FIG. 1) of seal carrier 54.

Furthermore, it is apparent in FIG. 2 that second guide section 72 or second ring-shaped plastic element 72a has an essentially L-shaped radial cross section.

Figure 3:
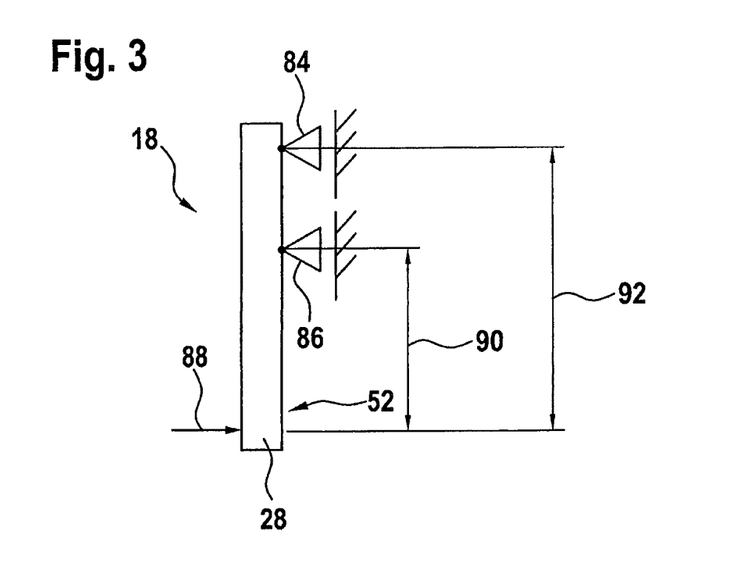
FIG. 3 shows a first schematic representation of the pump piston and forces acting upon it according to the related art.

FIG. 3 shows a first schematic representation of pump piston 28 and forces acting upon it, as are possible in previously known specific embodiments of piston fuel pump 18 according to the related art. In a center and upper section of pump piston 28 in FIG. 3, two radially acting supports 84 and 86 are schematically represented in the right-hand portion of the drawing. In a left-hand lower area in FIG. 3, a radially acting transverse force 88 acts in an area of lower end section 52 of pump piston 28. For example, transverse force 88 (depicted in FIG. 3 by an arrow) is a sum of transverse forces which are transferred to spring collar 31 by coil spring 32 and/or by drive 29.

Double arrows 90 and 92 indicate an axial clearance between each of supports 84 and 86 and an axial dimension of the force application determined by transverse force 88. It is apparent that, because of the comparatively small axial clearance between supports 84 and 86, the momentum acting on pump piston 28 via transverse force 88 results in comparatively large radial forces acting upon pump piston 28 in the area of supports 84 and 86.

Figure 4:
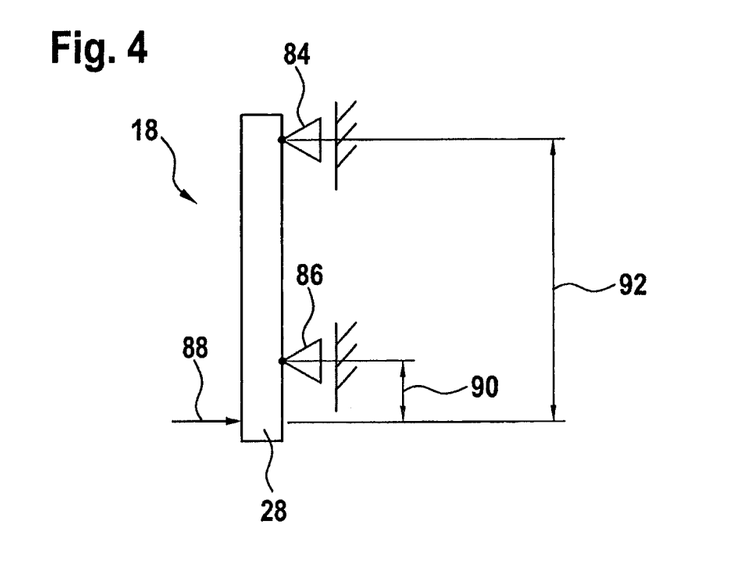
FIG. 4 shows a second schematic representation of the pump piston and forces acting upon it according to the present invention.

FIG. 4 shows a second schematic representation of pump piston 28 and forces acting upon it which may possibly occur in piston fuel pump 18 according to the present invention. Unlike the previously known specific embodiment according to FIG. 3, the axial clearance between supports 84 and 86 (which correspond to first and second guide sections 51 and 72) is comparatively large. Correspondingly, the momentum acting upon pump piston 28 as a result of transverse force 88 results in only comparatively small radial forces acting upon pump piston 28 in the area of piston seal 68 and in the area of supports 84 and 86 or first and second guide sections 51 and 72. As a result, the fatigue strength of piston fuel pump 18 according to the present invention may be improved and/or guide sections 51 and 72 may be manufactured from a plastic material, for example, polyamide (PA) or a polyetheretherketone (PEEK).

Figure 5:
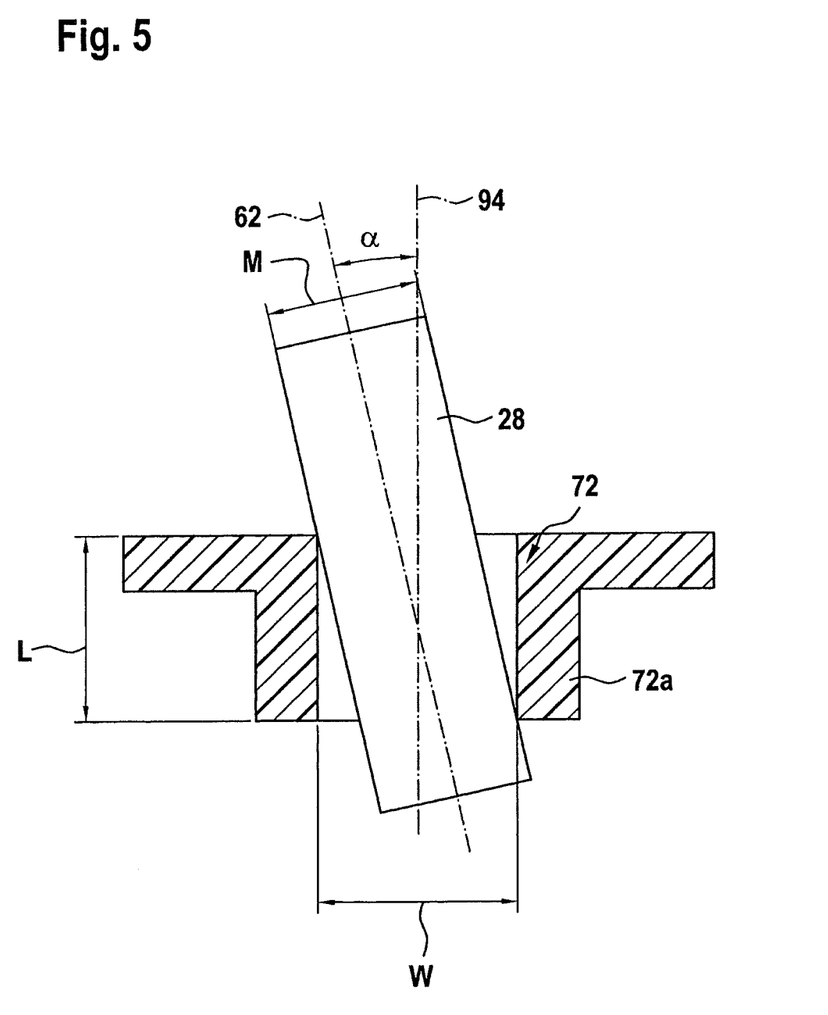
FIG. 5 shows a third schematic representation of the pump piston along with the second guide section.

FIG. 5 shows an additional schematic representation of pump piston 28 along with second guide section 72. Pump piston 28 has an outer diameter M and second guide section 72 or plastic element 72a has an inner diameter W. An axial dimension of second guide section 72 has a length L. Pump piston 28 is depicted maximally tilted in second guide section 72, an angle α resulting between piston longitudinal axis 62 and a longitudinal axis 94 of piston fuel pump 18.

Thus, a play S of pump piston 28 in second guide section 72 may be ascertained as S=W−M. Accordingly, it may be advantageous that a ratio of radial play S between second guide section 72 and pump piston 28 on the one hand and axial length L on the other hand is preferably small and is, for example, less than 0.01. For the purpose of simplification, in the depiction of FIG. 5, the effect of first guide section 51 (see FIG. 1) is not taken into account.

The design of plastic element 46 for first guide section 51 is presently of particular significance. Therefore, this plastic element will now be discussed in greater detail with reference to FIGS. 6 and 7.

Figure 6:
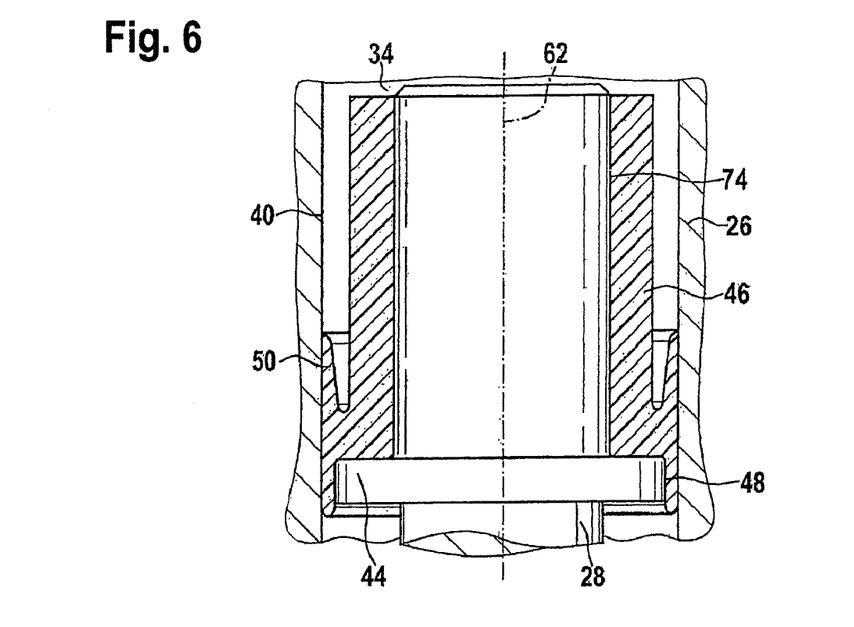
FIG. 6 shows an enlarged cross-sectional view of the section of the piston fuel pump according to FIG. 1 for explaining a supporting and sealing arrangement forming the first guide section.

FIG. 6 shows a cross-sectional view of a section of piston fuel pump 18 of FIG. 1, plastic element 46 being clearly apparent. In an upper area in FIG. 6, plastic element 46 has an insertion section 74 in the form of a straight tube section which is coaxial to pump piston 28 and which is penetrated by pump piston 28 or pushed onto it. In a lower area in FIG. 6, plastic element 46 is clip-fitted over shoulder 44 to pump piston 28. In particular, the available material area of plastic element 46 which is radially on the outside of the outer lateral surface of shoulder 44 forms the aforementioned support or guidance area 48, via which pump piston 28 is slidingly guided in pump cylinder 40 and radially supported.

Guidance area 48 has a clearance from an inner circumferential wall 76 of pump cylinder 40 of approximately 3/100 mm (millimeters), which is not visible in the figures. Following guidance area 48, sealing area 50, which is formed as a sealing lip, extends toward delivery chamber 34 in the axial direction, i.e., along piston longitudinal axis 62. Sealing lip 50 extends essentially coaxially to pump piston 28, as a tube section which is integrally molded onto guidance area 48 and which is radially outwardly pre-tensioned in an elastic manner. Guidance area 48 and sealing area 50 are designed as one piece in FIGS. 6 and 7.

Figure 7:
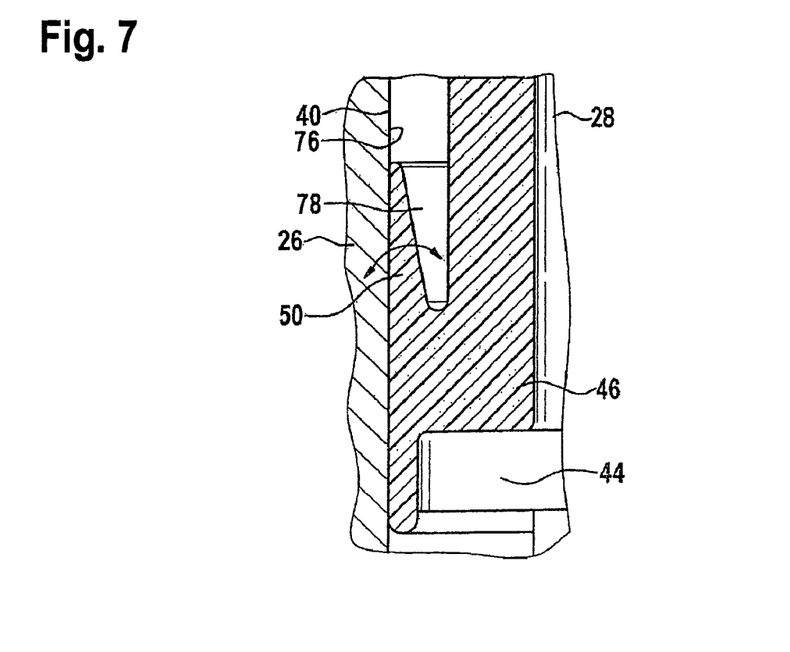
FIG. 7 shows an enlarged section of the cross-sectional view according to FIG. 6.

As is apparent again in the enlargement in FIG. 7, sealing lip 50 is in contact under pre-tension with inner circumferential wall 76 of pump cylinder 40. A recess is present in plastic element 46 between the sealing lip and sealing area 50, which forms a pressure support area 78. This pressure support area 78 is designed in such a way that during a movement of pump piston 28 to the top dead center, i.e., during the delivery stroke of piston fuel pump 18, the pressure prevailing in delivery chamber 34 acts in pressure support area 78 and thus also on the free outer side of the sealing lip, causing sealing lip 50 to be pressurized in a sealing manner toward wall 76, in addition to the pre-tension.

What is claimed is:

1. A piston fuel pump for a fuel injection system, comprising:
    a pump piston which has an end section facing a drive;
    a first guide section situated in a pump cylinder; and
    a second guide section situated in an area of the end section of the pump piston facing the drive;
    wherein the pump piston is guided radially with the first guide section and the second guide section, and wherein the first guide section and the second guide section are spaced axially apart from each other,
    wherein the second guide section is situated radially outwardly in an area of the end section of the pump piston facing the drive, so that the pump piston is guided at guidance and support points, of the first guide section and the second guide section, which are spaced substantially apart from one another, via the first guide section and via the second guide section,
    wherein the guidance and support points lie in end sections of the pump piston near force application points of the drive at which transverse forces arise, so as to reduce loads on the guidance and support points,
    wherein the second guide section is situated directly adjacent to a piston seal,
    wherein the pump piston has an upper end section on one end facing a delivery chamber,
    wherein the pump piston has a supporting-and-sealing unit for the pump piston on the first guide section, the supporting-and-sealing unit including (i) a guidance area for the radial guidance of the pump piston in the pump cylinder and (ii) a sealing area having sealing lips,
    wherein the supporting-and-sealing unit is formed by a plastic element,
    wherein the supporting-and-sealing unit is fixedly connected to the pump piston, and wherein the pump piston has a ring shaped shoulder, adjacent the upper end section of the pump piston, to which the supporting-and-sealing unit is at least one of clip-fitted and glued,
    wherein the sealing lips includes at least six sealing lips, and wherein the piston seal contacts a seal carrier and the guide sections and has six of the sealing lips on a radially inner section, which are circumferential and directed radially inwardly and arranged axially opposite each other in groups of three, and two radially circumferential toroidal sealing sections are situated on a radially outward section of the piston seal, so that the sealing lips seal dynamically against a radially outward surface of the pump piston which is axially movable, and the toroidal sealing sections seal statically against a receiving section of the seal carrier, and
    wherein a spring collar is pressed against a lower end section of the pump piston, which is subjected to an axial force by a coil spring, and wherein the pump piston and a pump housing delimit a delivery chamber.

2. The piston fuel pump as recited in claim 1, wherein the second guide section is situated on a side of the piston seal facing the drive.

3. The piston fuel pump as recited in claim 1, wherein the seal carrier supports both the piston seal and the second guide section.

4. The piston fuel pump as recited in claim 1, wherein the piston seal includes at least one of the radially circumferential toroidal sealing sections on a radially outer region.

5. The piston fuel pump as recited in claim 1, wherein the second guide section is ring-shaped and has an L-shaped radial cross section.

6. The piston fuel pump as recited in claim 1, wherein a ratio of (i) a radial gap between the second guide section and the pump piston to (ii) an axial length of the second guide section is less than 0.01.

7. The piston fuel pump as recited in claim 1, wherein the supporting-and-sealing unit is an integral one-piece element.

8. The piston fuel pump as recited in claim 1, wherein the supporting-and-sealing unit has multiple parts, including at least a first part and a second part.

9. The piston fuel pump as recited in claim 8, wherein the multiple parts of the supporting-and-sealing unit are at least one of clip-fitted and glued to each other.

10. The piston fuel pump as recited in claim 1, wherein a gap is present between the pump cylinder and the guidance area in the range of approximately 1/100 mm up to approximately 10/100 mm.

11. The piston fuel pump as recited in claim 1, wherein at least one of the second guide section, the plastic element, and the supporting-and-sealing unit includes at least one of a polyamide and a polyetheretherketone.

12. A piston fuel pump for a fuel injection system, comprising:
- a pump piston which has an end section facing a drive;
- a first guide section situated in a pump cylinder; and
- a second guide section situated in an area of the end section of the pump piston facing the drive;
- wherein the pump piston is guided radially with the first guide section and the second guide section, and wherein the first guide section and the second guide section are spaced axially apart from each other,
- wherein the second guide section is situated radially outwardly in an area of the end section of the pump piston facing the drive, so that the pump piston is guided at guidance and support points, of the first guide section and the second guide section, which are spaced substantially apart from one another, via the first guide section and via the second guide section,
- wherein the guidance and support points lie in end sections of the pump piston near force application points of the drive at which transverse forces arise, so as to reduce loads on the guidance and support points,
- wherein the second guide section is situated directly adjacent to a piston seal,
- wherein the pump piston has an upper end section on one end facing a delivery chamber,
- wherein the pump piston has a supporting-and-sealing unit for the pump piston on the first guide section, the supporting-and-sealing unit including (i) a guidance area for the radial guidance of the pump piston in the pump cylinder and (ii) a sealing area having sealing lips
- wherein the supporting-and-sealing unit is formed by a plastic element,
- wherein the supporting-and-sealing unit is fixedly connected to the pump piston, and wherein the pump piston has a ring shaped shoulder, adjacent the upper end section of the pump piston, to which the supporting-and-sealing unit is at least one of clip-fitted and glued, and
- wherein the piston seal has an generally H-shaped cross section and contacts a seal carrier and the guide sections, and
- wherein sealing lips includes at least six sealing lips, and wherein the piston seal has six of the sealing lips on a radially inner section, which are circumferential and directed radially inwardly and arranged axially opposite each other in groups of three, and two radially circumferential toroidal sealing sections are situated on a radially outward section of the piston seal, so that the sealing lips seal dynamically against a radially outward surface of the pump piston which is axially movable, and the toroidal sealing sections seal statically against a receiving section of the seal carrier, and
- wherein a spring collar is pressed against a lower end section of the pump piston, which is subjected to an axial force by a coil spring, and wherein the pump piston and a pump housing delimit a delivery chamber.

* * * * *